(12) United States Patent
Asada

(10) Patent No.: US 6,577,774 B1
(45) Date of Patent: Jun. 10, 2003

(54) IMAGE FORMING APPARATUS AND IMAGE FORMING METHOD

(75) Inventor: Kenichiro Asada, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/317,863

(22) Filed: May 25, 1999

(30) Foreign Application Priority Data

Sep. 8, 1998 (JP) .......................... 10-254004

(51) Int. Cl.[7] ................................ G06K 9/40
(52) U.S. Cl. ............ 382/264; 382/266; 382/209; 382/218
(58) Field of Search .................. 382/264, 266, 382/269, 254, 162, 167, 209, 217, 218, 181; 358/518

(56) References Cited

U.S. PATENT DOCUMENTS 5,249,242 A * 9/1993 Hanson et al. ............. 382/269
5,383,036 A * 1/1995 Mailloux et al. ........... 358/518
6,278,804 B1 * 8/2001 Okuyama .................. 382/261

FOREIGN PATENT DOCUMENTS

JP          9-130628        5/1997

* cited by examiner

Primary Examiner—Thomas D. Lee
(74) Attorney, Agent, or Firm—Oblon, Spivak, McClelland, Maier & Neustadt, P.C.

(57) ABSTRACT

In the image forming apparatus a binary-digitizing section compares inputted multi-valued image data with a threshold value and converts the image data to binary data, a template matching section determines whether smoothing is to be executed or not by comparing the binary-digitized data with the template data, a smoothing section converts the image data for a pixel determined as an object for smoothing to multi-valued data, and a data selector selects and outputs the multi-valued pixel data when the image data is determined as an object for smoothing, or selects and outputs the original data when the image data is not an object for smoothing.

12 Claims, 6 Drawing Sheets

IMAGE FORMING APPARATUS AND IMAGE FORMING METHOD

FIELD OF THE INVENTION

The present invention relates to an image forming apparatus and image forming method used in various types of devices such as a printer having a multi-value engine, facsimile equipment, an optical filing device, or an electronic sorting device, and more specifically to an image forming apparatus for selectively executing smoothing for inputted image data.

BACKGROUND OF THE INVENTION

Conventionally some types of image forming apparatus such as a digital copier having multiple functions such as a facsimile or a printer have a multi-value engine section and a frame memory capable of storing multi-value data therein and output any of 1-bit/dot, 2-bit/dot or 8-bit/dot image according to the option.

Figure 3:
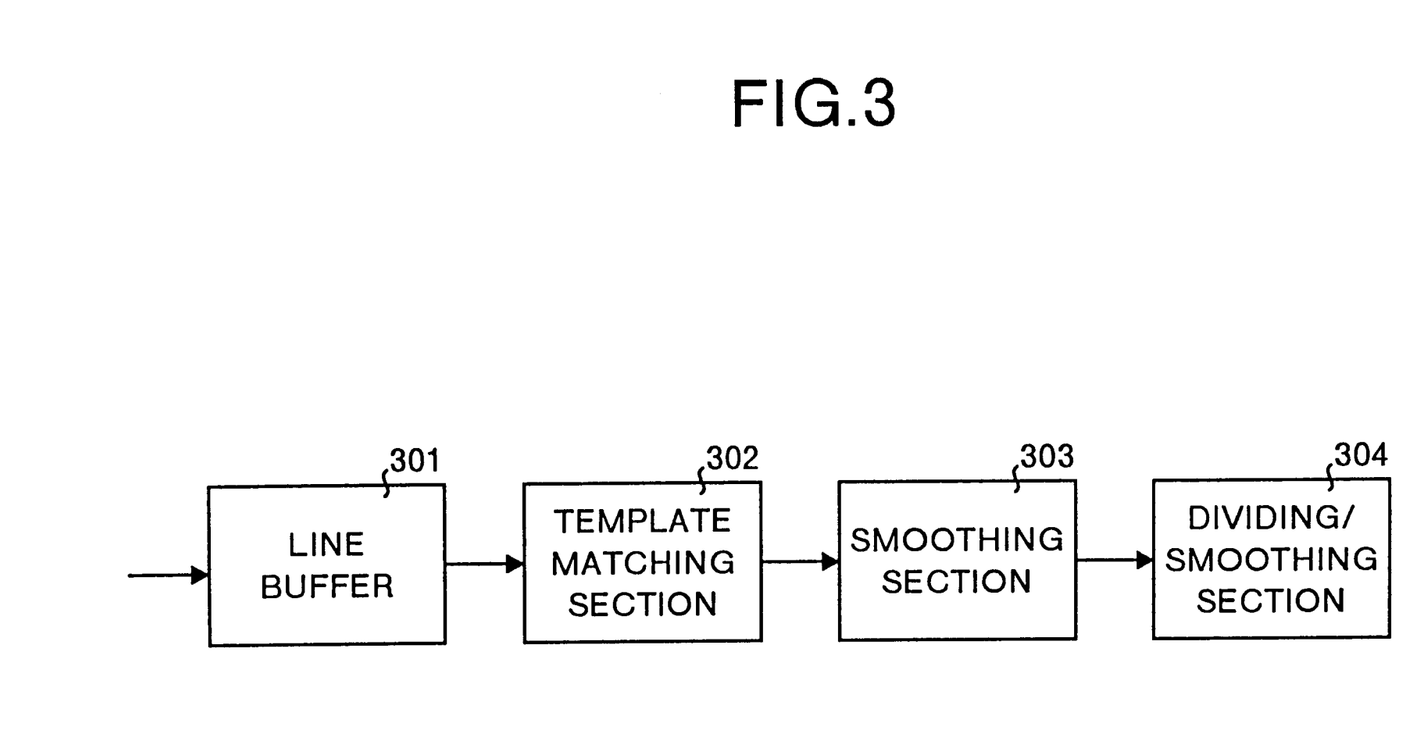
FIG. 3 is a block diagram showing an example of configuration of an image processing section for executing smoothing by converting binary image data to multi-valued image data in the conventional technology.

FIG. 3 is a block diagram showing configuration of an image processing section based on the conventional technology for executing smoothing by converting binary image data to multi-valued image data. In this figure, a line buffer 301 is a memory for storing therein inputted binary image data for a plurality of lines and transfers a group of n(dot)× m(line) data around a remarked pixel to a template matching section 302.

The template matching section 302 compares the data group to a preset data group and transfers a result of comparison to a smoothing section 303. The smoothing section 303 converts a remarked pixel to a j(dot)×k(line) enlarged image for smoothing according to a result of comparison in the template matching section 302, while a dividing/smoothing section 304 executes the processing for dividing and smoothing the image according to an expansion ratio of the image and outputs the image data having been subjected to the processing for smoothing by converting binary image data to multi-valued image data.

Figure 4:
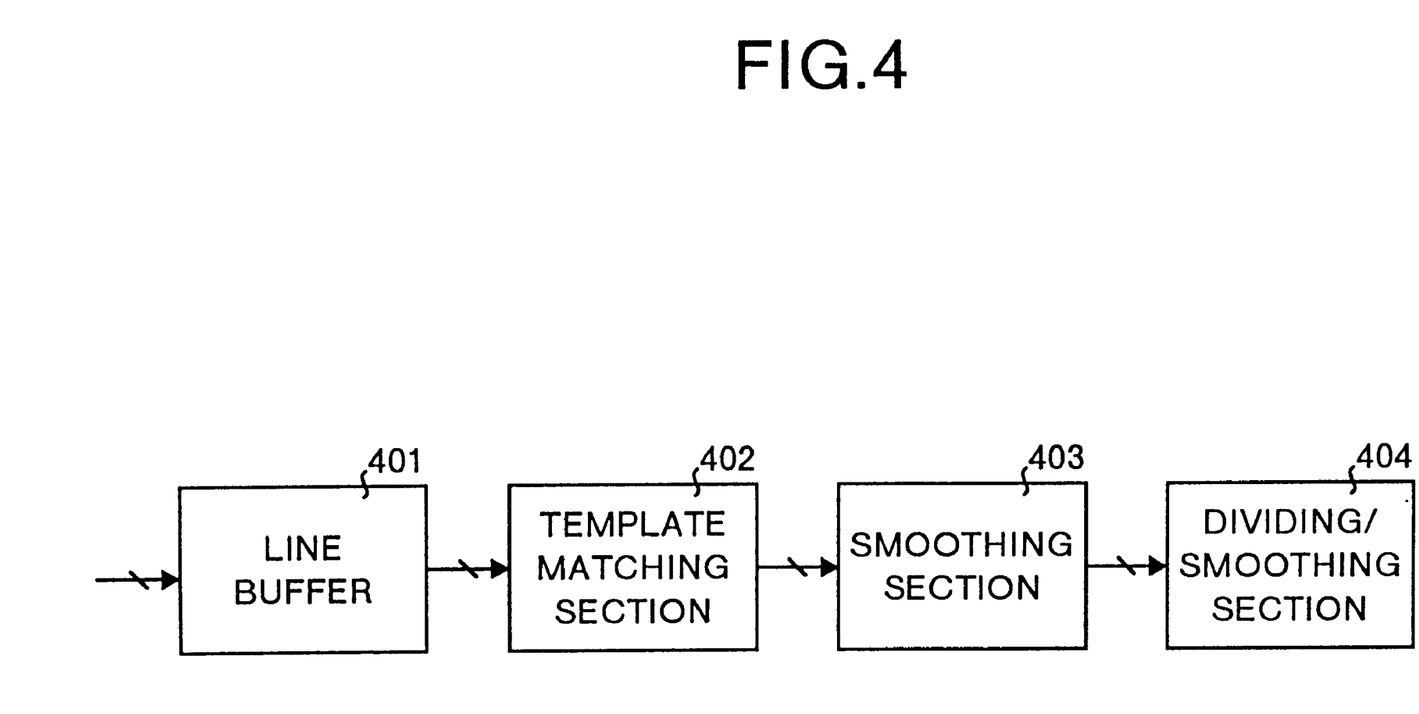
FIG. 4 is a block diagram showing an example of configuration of an image processing section based on the conventional technology for executing smoothing for multi-valued image data.

In the image processing apparatus described above, to accommodate multi-valued image data, there has been known the apparatus in which a line buffer 401 for storing therein multi-valued data for a plurality of lines and a multi-valued template matching section 402 are provided, and smoothing processing for multi-valued image data is executed in the smoothing section 403 with the processing for dividing and smoothing executed in the dividing/smoothing section 404 as shown, for instance, in FIG. 4.

Figure 5:
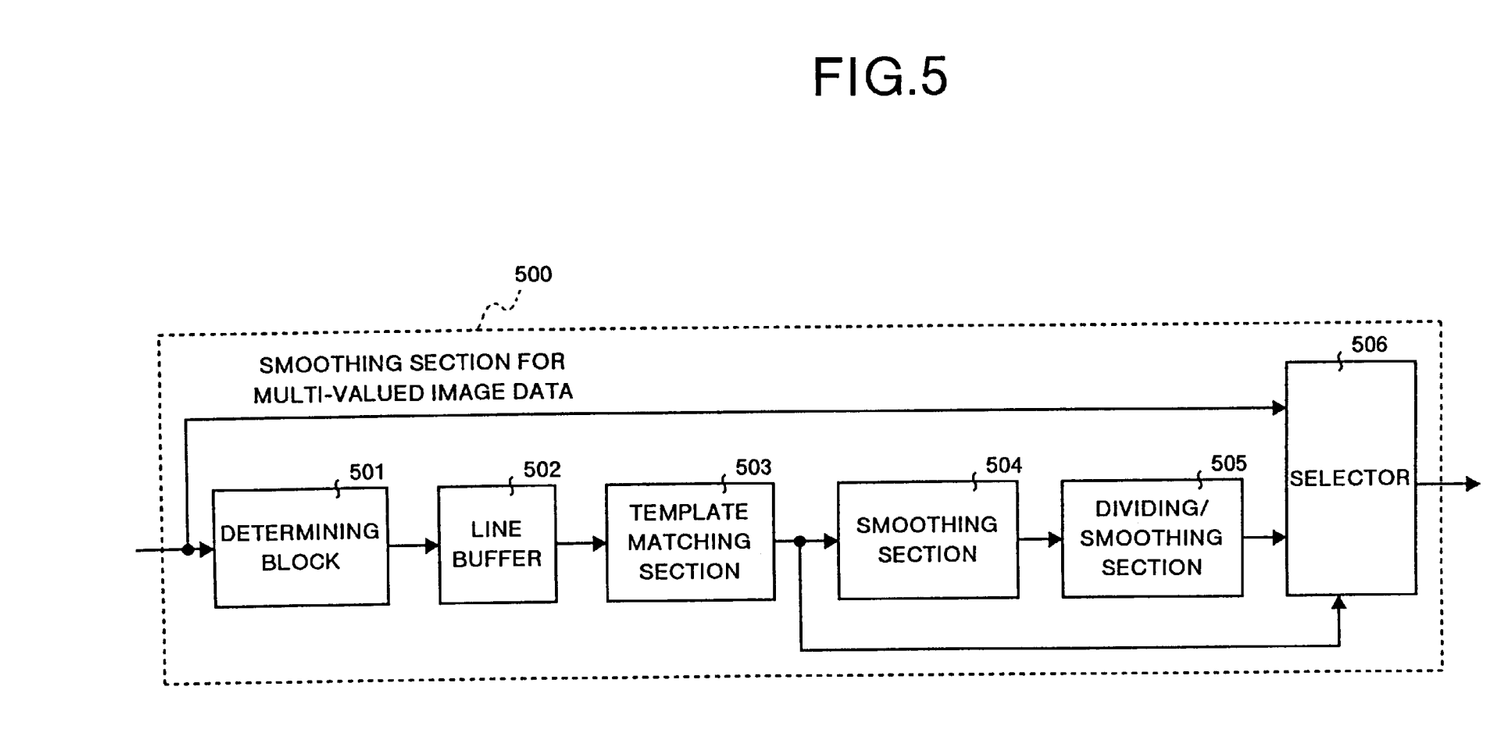
FIG. 5 is a block diagram showing internal configuration of a smoothing section based on the conventional technology for multi-valued image data.

However, there occurs the problem that a larger memory capacity for an increased bit number for multi-valued image data is required for the line buffer section 401 as well as for the template matching 402. To solve this problem, a multi-value smoothing section 500 for multi-valued image data as shown in FIG. 5 is provided.

Even in a case of multi-valued image data for a remarkably jagged image, a density may be full (100%) in some sections, and to respond to this problem, a determining block 501 for determining whether density of an inputted multi-valued image is full or not is provided on the upstream side of a line buffer 502. It should be noted that a template matching section 503, a smoothing section 504, and a dividing/smoothing section 505 are provided, as described above, on the downstream side of the line buffer 502 and further a selector 506 is provided for switching the pixels to be converted according to a result of processing in the template matching section 503.

Figure 6A:
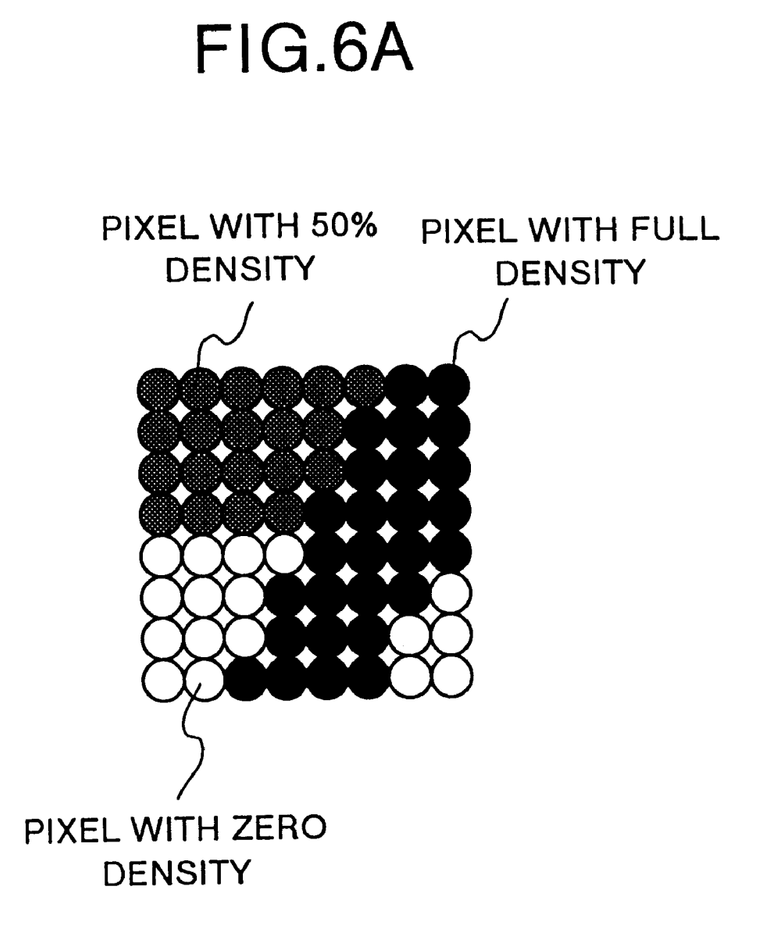
FIGS. 6A and 6B are explanatory views showing an example of a smoothing process in FIG. 5.
Figure 6B:
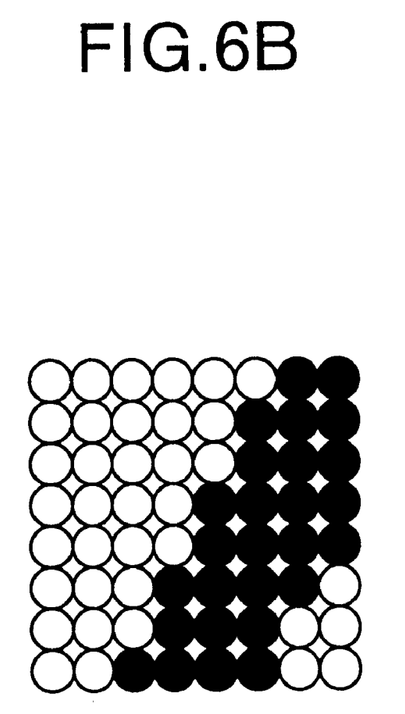

The determining block 501 supplies, for instance, only image data for pixels having a full density value of the image as shown in FIG. 6A as true value (1) to the line buffer 502, subjects the pixels to smoothing processing by converting binary data to multi-values in the template matching section 503, smoothing section 504, and dividing/smoothing section 505, and switching only the converted pixels with the selector 506.

Japanese Patent Laid-Open Publication No. HEI 9-130628 discloses as a technology related to the multi-value smoothing processing for the multi-valued image data for a color image as described above.

In the apparatus for processing multi-valued data based on the conventional technology as shown in FIG. 5, however, there are jagged images for characters and strings, so that it is not appropriate to execute smoothing processing only to 1-bit/dot binary image data. Therefore, it is required to execute smoothing processing to multi-value data. However, if input image data is subjected as it is to the smoothing processing there is a disadvantage that a larger memory capacity is required.

When a color image based on multi-valued image data is outputted, an image with a photograph (image section) and characters (character section) coexisting therein is required to be frequently outputted. Although the smoothing processing is effective for reducing jags in the characters, when the same smoothing processing is executed to the whole image to be outputted, if a data array identical to the template data is present also in any image section, the gradation becomes lower as the same processing is executed to both the character sections and image sections, which may sometimes generate a false contour not present in the original data thereof. Further, it is required in some types of data to execute smoothing processing only to black characters or to change the degree of the smoothing processing according to colors, but the conventional technology can not be applied to the cases as described above.

SUMMARY OF THE INVENTION

It is a first object of the present invention to reduce a data volume in template matching for the purpose to reduce a required memory capacity by converting multi-valued input image data to binary image data in a smoothing process.

It is a second object of the present invention to realize an optimal smoothing process by determining whether smoothing is to be executed or not according to the type of image data.

In the image forming apparatus according to the present invention, input image data is compared with a threshold value data previously set and is then converted to binary data, so that the amount of image data for a n×m area for comparison during template matching can be reduced.

Other objects and features of this invention will become apparent from the following description with reference to the accompanying drawings.

DESCRIPTION OF THE PREFERRED EMBODIMENTS

Detailed description is made hereinafter for the image forming apparatus and image forming method according to the present invention with reference to the attached drawings.

In this Embodiment, description is made for a case where instructions as to whether smoothing should be executed or not are previously set in an internal register and whether a result of smoothing should be outputted or inputted color image data should be outputted as it is can be selected according to a preset value.

Figure 1:
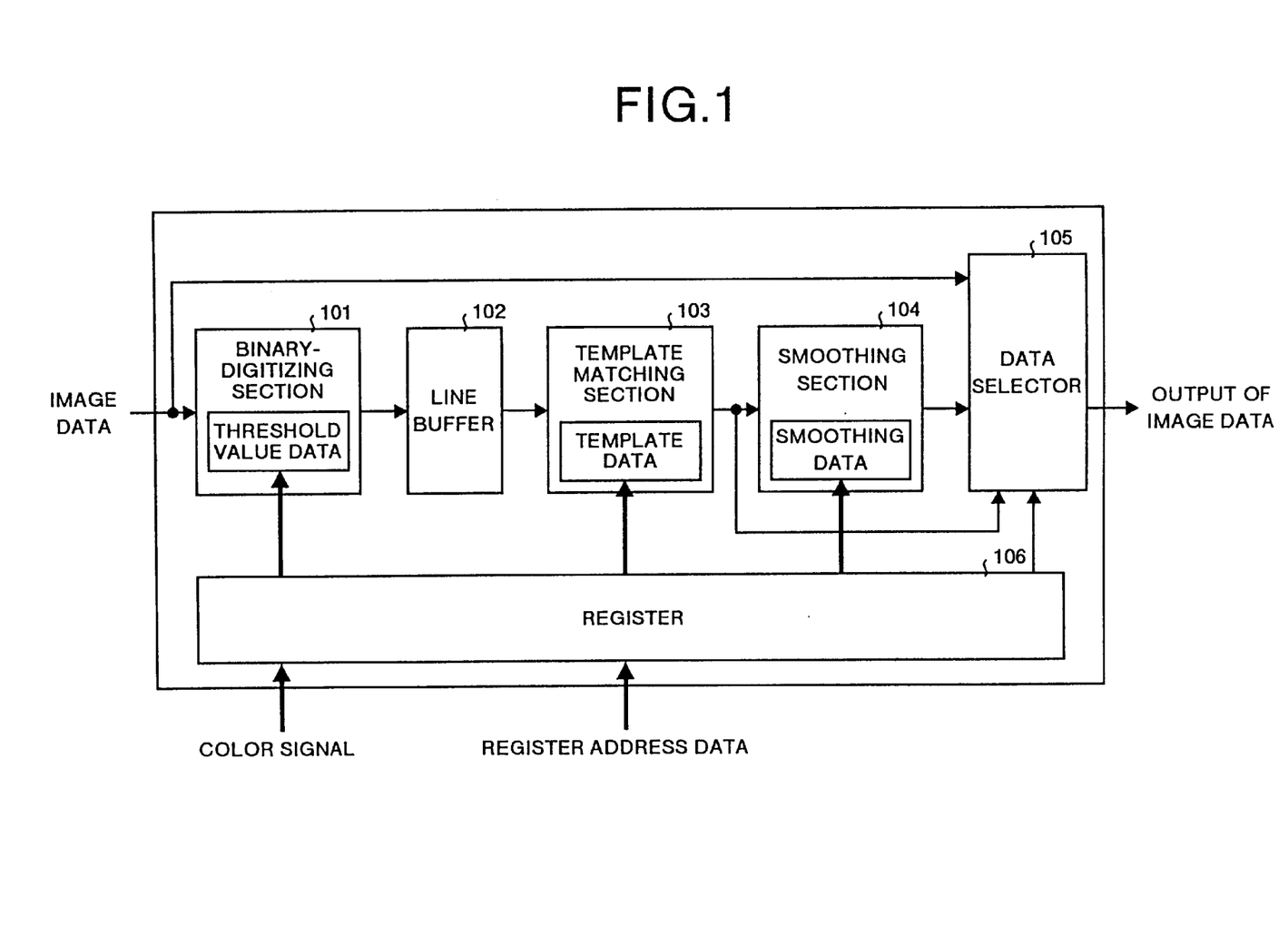
FIG. 1 is a block diagram showing configuration of an image processing section used in an image forming apparatus according to Embodiment 1 of the present invention.

FIG. 1 is a block diagram showing configuration of an image processing section used in an image forming apparatus according to Embodiment 1 of the present invention. In this figure, the reference numeral 101 indicates a binary-digitizing section as a means for obtaining binary-digitized data for a group of n(dot)×m(line) data by comparing inputted multi-value image data to preset threshold data and executing binary-digitizing processing to extract characters and strings, and the reference numeral 102 indicates a line buffer for storing therein the data digitized in the binary-digitizing processing section 101.

The reference numeral 103 indicates a template matching section as a means for executing template matching by comparing binary-digitized data for a group of n(dot)×m (line) data to template data previously prepared to determine whether the data should be subjected to smoothing or not.

The reference numeral 104 indicates a smoothing section as a means for converting image data for a pixel determined in the template matching section 103 as an object for smoothing to multi-valued data by interpolating and modifying the image data according to smoothing data previously prepared.

The reference numeral 105 indicates a data selector as a data selecting unit for receiving multi-valued data interpolated and modified in the smoothing section 104 and selectively outputting the multi-valued pixel data having been subjected to smoothing or the original multi-valued pixel data according to a result of determination in the template matching section 103 as to whether the pixel data should be subjected to smoothing or not. The reference numeral 106 indicates a register as a means for receiving color signals or setting data indicating whether smoothing should be executed or not.

Description is made for operations of the image processing section having the configuration as described above. Generally, a color image has a multi-valued frame memory for 4 plains of yellow, magenta, cyan, and black. Smoothing for multi-valued image data may be executed for each of these colors. As an object for smoothing to correct a jagged image is mainly data having a higher density level, so that at first characters and strings are extracted according to threshold value data set from outside in the binary-digitizing section 101. Namely, inputted multi-valued image data is compared to threshold value data which can externally be set, and data having a value higher than the threshold value is extracted.

The binary-digitized data is stored in the line buffer 102, and the n(dot)×m(line) data group around a remarked pixel is compared in the template matching section 103 to template data set from outside to determine whether the data group is to be smoothed or not. A result of determination in the template matching section 103 is sent to the smoothing section 104, and data for a pixel determined as an object for smoothing is converted to multi-valued data interpolated and modified as described above according to the smoothing data externally set and is sent to the data selector 105.

The multi-valued data interpolated and modified in the smoothing section 104 and original data of the image data are inputted into the data selector 105. When a remarked pixel is determined as an object for smoothing, the multi-valued pixel data having been subjected to smoothing is selected and outputted from the data selector 105. On the other hand, when the remarked pixel is not determined as an object for smoothing, the original multi-valued pixel data is selected and outputted from the data selector 105.

As described above, determination as to whether a remarked pixel is to be smoothed or not is made in the template matching section 103, and interpolated and modified multi-values data or original data for the image data is selected and outputted from the data selector 105 according to a result of the determination in the template matching section 103.

In some cases, smoother (less jagged) image output can be obtained by specifying an extraction level of a pixel to be smoothed automatically or upon an instruction by a user according to the γ-characteristics (input/output characteristics) or a printer engine (an image printing section) or according to a type of inputted multi-valued image data. For instance, in a case of a printer for monochrome output or a facsimile machine, better image output (character image) can be obtained by changing threshold value data to change an extraction level for a character section.

In a case of color image data, a frequency of generation of color degradation or the like can be reduced by lowering the threshold value data for black data so that black characters can easily be extracted or by increasing for other colors (for instance by setting threshold value data to FF (H) for input of 8-bit multi-valued image).

Further, even if threshold value data is changed for each color as described above, errors can not be eliminated completely. In a case of color image data, an object for smoothing is character, and in most cases, smoothing is not required to be executed for other image areas. Also in this case, defective images due to a smoothing error for the image areas can be reduced by selecting image data output from the data selector 105 so that a result of operations in the smoothing section 104 is validated only when image data for black color is inputted, and also so that input image data is outputted from the data selector 105 as it is when image data for other colors is inputted.

In some cases, dither processing or area gradation processing is executed for inputted multi-valued image data. In this case, extraction of an object for smoothing can be optimized even for data subjected to gradation processing by switching template data in the template matching section 103 to ordinary image data input (data not having been subjected to the dither processing nor to the area gradation processing).

Further, in a case of a color image, gradation processing is changed for each color in many cases, so that the template data optimized for each color may be used as the template data. In this step, by optimizing not only the template data, but also the smoothing data, the detecting precision becomes higher, and smooth character output is realized.

In the Embodiment 1 shown in FIG. 1, a color signal is inputted into the register 106, and smoothing ON/OFF is switched according to the color, but in Embodiment 2 described below, smoothing ON/OFF is switched with a faster cycle.

Figure 2:
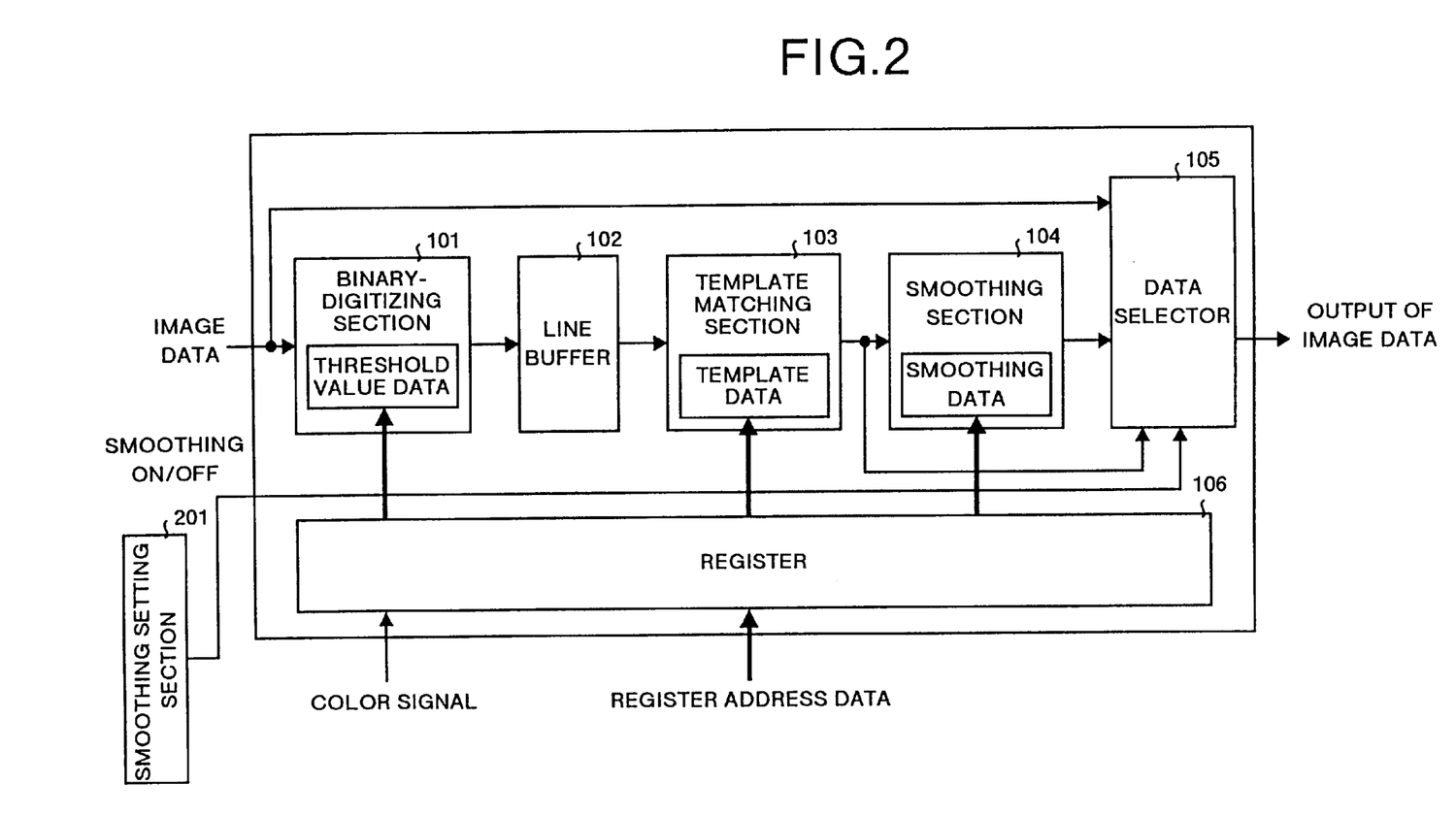
FIG. 2 is a block diagram showing configuration of an image processing section used in an image forming apparatus according to Embodiment 2 of the present invention.

FIG. 2 is a block diagram showing configuration of the an image processing section applied in the image forming apparatus according to Embodiment 2 of the present invention, and there is provided a smoothing setting section 201 capable of inputting a smoothing ON/OFF signal from the outside. Other basic components and functions are the same as those in FIG. 1 and the same reference numerals as those used in FIG. 1 are assigned to the same components.

Namely, input of a smoothing ON/OFF signal can be executed independently by specifying image data or an image data rate. Further, the threshold value data, template data, and smoothing data are not fixed values, and are provided in the form of a rewritable table.

Description is made for operations of the image processing section having the configuration as described above. At first, like in Embodiment 1 described above, characters and strings are extracted according to the threshold value data set in the binary-digitizing section 101 from the outside. Namely, the inputted multi-valued image data is compared to the threshold value data which can be set from the outside, and data having a value higher than the threshold value is extracted.

The binary-digitized data is accumulated in the line buffer 102, and the n(dot)×m(line) data group around a remarked pixel is compared with the template data set from the outside and determination is made as to whether the data group is to be smoothed or not. A result of determination in the template matching section 103 is sent to the smoothing section 104, and data for a pixel determined as an object for smoothing is converted to multi-valued data obtained by interpolating and modifying image data according to the smoothing data set from the outside, and then the data is sent to the data selector 105.

Multi-valued data interpolated and modified in the smoothing section 104 and the original image data are inputted into the data selector 105. When the smoothing ON/OFF signal is ON, multi-valued pixel data having been subjected to smoothing is selected and outputted from the data selector 105. On the other hand, when the smoothing ON/OF signal is OFF, the original multi-valued pixel data is selected and outputted from the data selector 105.

As described above, interpolated and modified multi-valued data or original data for the image data is selected and outputted from the data selector 105 according to the smoothing ON/OFF signal inputted with a specified dot rate.

In the Embodiment 2 described above, especially when data for black color is inputted, smoothing is turned ON for an area of a character section, and OFF for an area of an image section, so that generation of a smoothing error in an area for an image section can be prevented.

As described above, with the image forming apparatus and image forming method according to the present invention, input image data is compared with the threshold value data previously set and converted to binary data, so that the amount of image data for a n×m area for comparison during template matching can be reduced. Therefore, a data in template matching is reduced and hence required memory capacity can be reduced.

With the image forming apparatus and image forming method according to the present invention, whether smoothing is to be executed or not is switched (turned ON/OFF) from the outside. Smoothing is executed when character data is inputted while the image data is outputted as it is without executing smoothing, so that generation of an error in smoothing when image data is outputted can be prevented.

With the image forming apparatus and image forming method according to the present invention, whether smoothing is to be executed or not can be specified for an image area and a character area even in image data for one page, so that generation of an error in the image section can be prevented.

With the image forming apparatus and image forming method according to the present invention, an extraction level (binary-digitizing level) for characters can be changed by changing the threshold value data according to a type of image data, so that optimal character extraction level is realized for an input image.

With the image forming apparatus and image forming method according to the present invention, an extraction level for characters as an object for smoothing can be changed by changing the template data according to a type of image data, so that an optimal character extraction level can be set for an inputted image.

With the image forming apparatus and image forming method according to the present invention, the smoothing data is changed according to a type of image data, so that optimal interpolation data can be set for a pixel as an object for smoothing.

With the image forming apparatus and image forming method according to the present invention, whether smoothing is to be executed or not can be specified for each color, so that generation of troubles such as color degradation at an edge section or an error in an image section can be prevented.

With the image forming apparatus and image forming method according to the present invention, whether smoothing is to be executed or not can be specified for each color and (or) for each image area, so that generation of troubles such as color degradation at an edge section or an error in an image section can be prevented.

With the image forming apparatus and image forming method according to the present invention, an extraction level (binary-digitizing level) for colored characters can be changed by changing the threshold value data according to a color, so that optimal character extraction level can be set for an inputted image.

With the image forming apparatus and image forming method according to the present invention, the template data is changed according to a color, so that an extraction level for colored characters as an object for smoothing can be changed and optimal character extraction level can be set for an inputted image.

With the image forming apparatus and image forming method according to the present invention, optimal interpolation data for a pixel as an object for smoothing can be set for each color by changing the smoothing data according to a color, so that such processing as data interpolation so that only sections corresponding to data for black color will be bold can be performed.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image forming apparatus comprising:

a binary data obtaining unit for receiving input multi-valued original image data and for obtaining binary data for a group of n(dot)×m(line) data by executing processing for obtaining binary data for extracting characters and strings by comparing the inputted multi-valued original image data to a preset threshold value data;

a template matching unit for determining whether smoothing is to be executed or not by comparing the binary data for the n(dot)×m(line) data group with a template data previously prepared;

a smoothing unit for interpolating and adjusting pixels determined by the template matching unit to be smoothed according to a smoothing data previously prepared to convert the pixel data to multi-valued data;

a data setting unit with the threshold value data, template data, and smoothing data set therein; and a data selecting unit for receiving the multi-valued pixel data outputted from said smoothing unit and the inputted multi-valued original image data input to the binary data obtaining unit, when it is determined by said template matching unit that smoothing is to be executed for selecting and outputting the multi-valued image data having been subjected to smoothing, and when it is determined by said template matching unit that smoothing is not to be executed for selecting and outputting the inputted multi-valued original image data.

2. An image forming apparatus according to claim 1 further comprising an external setting unit for setting whether result of smoothing is to be outputted or not for each image output unit.

3. An image forming apparatus according to claim 2; wherein said smoothing unit executes smoothing for an arbitrary image area or for each pixel according to setting by said external setting unit.

4. An image forming apparatus according to claim 1; wherein the threshold data can variably be set.

5. An image forming apparatus according to claim 1; wherein the template data can variably be set.

6. An image forming apparatus according to claim 1; wherein the smoothing data can variably be set.

7. An image forming apparatus according to claim 1; wherein the input multi-valued image data is for a color image and determination as to whether smoothing is to be executed or not is made for each color unit.

8. An image forming apparatus according to claim 1; wherein the inputted multi-valued image data is for a color image and smoothing is executed for an arbitrary image area or for each pixel.

9. An image forming apparatus according to claim 1; wherein the inputted multi-valued image data is for a color image and the threshold value data can variably be set for each color unit.

10. An image forming apparatus according to claim 1; wherein the inputted multi-valued image data is for a color image and the template data can variably be set.

11. An image forming apparatus according to claim 1; wherein the inputted multi-valued image data is for a color image and the smoothing data can variably be set.

12. An image forming method comprising the steps of:

obtaining binary data for a group of n(dot)×m(line) data by executing processing for obtaining binary data for extracting characters and strings by comparing inputted multi-valued original image data to a preset threshold value data;

determining whether smoothing is to be executed or not by comparing the binary data for the n(dot)×m(line) data group with a template data previously prepared;

interpolating and adjusting pixels determined by the template matching step to be smoothed according to a smoothing data previously prepared to convert the pixel data to multi-valued data;

setting the threshold value data, template data, and smoothing data; and receiving the multi-valued pixel data outputted from said smoothing step and the inputted multi-valued original image data, when it is determined by said template matching step that smoothing is to be executed for selecting and outputting the multi-valued image data having been subjected to smoothing, and when it is determined by said template matching step that smoothing is not to be executed for selecting and outputting the inputted multi-valued original image data.

* * * * *